United States Patent [19]

Brinkmeyer et al.

[11] Patent Number: 4,687,709

[45] Date of Patent: Aug. 18, 1987

[54] MAGNETIC RECORDING CARRIER CONTAINING RADIATION HARDENABLE DISPERSING AGENTS

[75] Inventors: Hermann Brinkmeyer, Krefeld; Gerhard Hübler, Munich; Hermann Perrey, Krefeld; Burkhard Nippe, Munich; Heinrich Kober, Hohenschaeftlarn, both of Fed. Rep. of Germany

[73] Assignee: Agfa Gevaert Aktiengesellschaft Leverkusen, Fed. Rep. of Germany

[21] Appl. No.: 915,783

[22] Filed: Oct. 6, 1986

[30] Foreign Application Priority Data

Oct. 19, 1985 [DE] Fed. Rep. of Germany ....... 3537258

[51] Int. Cl.$^4$ ............................................. H01F 10/02
[52] U.S. Cl. .................................... 428/425.9; 427/36; 427/44; 427/128; 427/130; 428/481; 428/522; 428/694; 428/900
[58] Field of Search ................... 427/36, 44, 128, 130; 428/425.9, 481, 522, 694, 900

[56] References Cited

U.S. PATENT DOCUMENTS 4,526,837  7/1985  Ohtsuki et al. .................... 428/900

FOREIGN PATENT DOCUMENTS 2097415  11/1982  United Kingdom .

Primary Examiner—Bernard D. Pianalto
Attorney, Agent, or Firm—Connolly and Hutz

[57] ABSTRACT

This invention relates to a magnetic recording carrier in which the magnetic layer and/or the backing layer contains, in addition to the usual additives, radiation hardenable dispersing agents based on ethylenically unsaturated phosphoric acid ester mixtures capable of forming bataine type stuctures and consisting of reaction products of (A) an acrylic acid ester and/or oligo acrylate containing 1 OH group per molecule, (B) a tertiary alkylamine containg 1 OH group per molecule and (C) phosphorus pentoxide, the reaction products having acid numbers below 200.

10 Claims, No Drawings

MAGNETIC RECORDING CARRIER CONTAINING RADIATION HARDENABLE DISPERSING AGENTS

This invention relates to magnetic recording carriers containing radiation hardenable dispersing agents based on ethylenically unsaturated phosphoric acid ester mixtures.

Magnetic recording carriers consist substantially of a layer support and a layer containing finely divided magnetic pigments and polymeric binders.

In addition to these main components, the magnetic layers may contain inter alia lubricants, abrasives, fillers, plasticizers, antistatic agents, viscosity regulating substances introduced in the process of preparation and dispersing agents.

These dispersing agents are interface active substances which have the function of ensuring uniformly fine, agglomerate free distribution of the pigments, in particular of magnetic pigments, in the binder and enabling the magnetic pigments to be orientated to produce an excellent electro acoustic quality.

The high degree of dispersion achieved also improves the surface smoothness which is an important precondition for close contact between the magnetic head and the magnetic recording carrier whereby the magnetic tapes are enabled to run smoothly and the loss by friction and abrasion on the magnetic recording carrier and the magnetic head is reduced. The dispersing agents are also intended to improve the bond between the binder and the pigment.

Various dispersing agents for magnetic pigments are known and in use, as for example fatty acids, their ammonium salts, fatty acid amides, aliphatic amines, aliphatic, aromatic and araliphatic sulphonic acids, sulphonic acid esters, fatty alcohol sulphonates, phosphoric acid esters of polyoxyalkylene, sorbitan esters and phosphatides such as lecithins and cephalins.

Although excellent distribution of the magnetic pigments in the binder can be achieved with such dispersing agents, these low molecular weight compounds reduce the strength of the magnetic layer and in the long run migration of these dispersing agents may lead to loss of quality, for example of the smooth running properties of a magnetic tape.

Phosphoric acid esters are described as dispersing agents in GB No. 2 097 415. The substances mentioned there include in particular products which are obtained by the reaction of a di-(hydroxypolyoxyalkylene)-phosphoric acid ester with an adduct of a hydroxyalkyl(meth)acrylate and a polyisocyanate and which therefore contain ethylenically unsaturated double bonds and are used in combination with a polymerisable binder to produce magnetic coatings which can be cross linked by radiation so that the disadvantages mentioned above are eliminated.

Since these dispersing agents are prepared from phosphorus oxychloride, their synthesis is accompanied by the release of hydrogen chloride. The phosphoric acid esters of a phosphorus oxychloride and a polyhydric alcohol cannot be completely freed from hydrogen chloride even when subjected to repeated washing processes with water which considerably reduce their yield. A more effective method of washing with alkalies can only be carried out in exceptional cases on these reaction products owing to the solubility of the resulting salts in water or the formation of emulsions. Traces of chloride ions then enter the magnetic dispersions and may accelerate corrosion of the magnetic head.

According to the present invention, the disadvantages described above are overcome by means of a magnetic recording carrier containing radiation hardenable dispersing agents based on ethylenically unsaturated phosphoric acid ester mixtures capable of forming betaine type structures, said dispersing agents consisting of a reaction product of A. 1–2.5 OH equivalents of a (meth)acrylic acid ester and/or oligo(meth)acrylate containing 1 hydroxyl group per molecule,
B. 1–2.5 OH equivalents of a saturated and/or ethylenically unsaturated tertiary alkylamine containing 1 hydroxyl group per molecule and
C. 1 mol of phosphorus pentoxide or 1 mol of phosphorus pentoxide equivalent, the sum of OH equivalents from A and B amounting to at least 3–4 and the reaction products having an acid number (mg KOH/g of substance) of less than 200, preferably less than 150 and most preferably less than 100 and being optionally neutralised with a base. The process of preparation of the dispersing agents according to the invention is described below. The term (meth)acrylic acid esters is used to denote esters of acrylic acid, of methacrylic acid or of mixtures of esters of these acids.

(Meth)acrylic acid esters (A) containing 1 hydroxyl group per molecule are hydroxy alkyl(meth)acrylates or aligo(meth)acrylates containing 1 hydroxyl group per molecule, such as, for example, 2-hydroxyethyl(meth) acrylate, 2-hydroxypropyl(meth)acrylate, 3-hydroxypropyl (meth)acrylate, 4-hydroxybutyl(meth)acrylate, 3-chloro-2-hydroxypropyl(meth)acrylate, 6-hydroxyhexyl(meth) acrylate, glycerol di(meth)acrylate, trimethylol propane di(meth)acrylate, pentaerythritol tri(meth)acrylate, (meth)acrylic acid esters of the corresponding ethoxylated and/or propoxylated alcohols and esters of at least one of the above described examples of a hydroxy alkyl (meth)acrylate or oligo(meth)acrylate containing one hydroxyl group per molecule and an aliphatic $C_3$–$C_{18}$ monohydroxy monocarboxylic acid such as, for example, 2-hydroxy propanoic acid, 3-hydroxy propanoic acid, 2-hydroxy butanoic acid, 3-hydroxy butanoic acid, 2-hydroxy-3-methylpropanoic acid, 2-hydroxy pentanoic acid, 3-hydroxy pentanoic acid, 2,2-dimethyl-3-hydroxy propanoic acid, 2-hydroxy hexanoic acid, 3-hydroxy hexanoic acid, 10-hydroxy decanoic acid, 12-hydroxy dodecanoic acid, 10-hydroxy hexadecanoic acid, 10-hydroxy stearic acid or ricinoleic acid.

The methods of preparing esters from a hydroxy carboxylic acid and a hydroxy alkyl(meth) acrylate or oligo(meth)acrylate containing one hydroxyl group per molecule are to be adapted to the properties of the hydroxy carboxylic acids.

Hydroxy carboxylic acids which have no tendency to form intramolecular esters, for example, may be reacted under the conditions of azeotropic esterification with a hydroxy alkyl(meth)acrylate or oligo(meth)acrylate containing one hydroxyl group per molecule. Aliphatic, aromatic or halogenated aliphatic hydrocarbons such as petroleum ethers, cyclohexane, benzene, toluene, or carbon tetrachloride may be used as entraining agents. The esterification may be accelerated by acid catalysts such as sulphuric acid or p-toluene sulphonic acid.

Another method consists of transesterification of suitable hydroxy carboxylic acid esters with a hydroxy alkyl(meth)acrylate or oligo(meth)acrylate containing one hydroxyl group per molecule in the presence of a transesterification catalyst. Hydroxy carboxylic acids, preferably in the form of their β-lactones, may be reacted as such with one of these (meth)acrylic acid esters containing one hydroxyl group per molecule with the aid of a suitable catalyst (see Methoden der Organischen Chemie, Houben-Weyl, volume 6/2, page 530, 6 Thieme Verlag, Stuttgart 1963).

The compounds used as component A may also be polyester(meth)acrylates containing one hydroxyl group per molecule obtained from a component I consisting of an alcohol or saturated or unsaturated polyester or polyether which is di-functional or tri-functional with respect to the hydroxyl groups, a component II consisting of an aliphatic, cycloaliphatic or aromatic dicarboxylic acid, preferably a cyclic dicarboxylic acid anhydride such as succinic acid anhydride, maleic acid anhydride, phthalic acid anhydride, tetrahydrophthalic acid anhydride or hexahydrophthalic acid anhydride, and a component III consisting of a hydroxy alkyl(meth)acrylate or oligo(meth) acrylate containing one hydroxyl group per molecule. The stoichiometry of components I to III is chosen to give rise to polyester(meth)acrylates containing only one hydroxyl group per molecule. The components are preferably reacted in such a sequence that the dicarboxylic acid (component II) is reacted in a preliminary stage, preferably as the anhydride, with a hydroxy alkyl(meth) acrylate or oligo(meth)acrylate containing one hydroxyl group per molecule (component III) and the product of the preliminary stage is then reacted with the di-functional or tri-functional polyol (component I).

A polyester or polyether (meth)acrylate containing one hydroxyl group per molecule and obtained by direct esterification of one mol of the difunctional or trifunctional component I with one or, respectively, two mol of (meth)acrylic acid may equally well be used as component A. Di-functional components I are preferred in both cases.

Both the esterification reactions and the alcoholysis of the cyclic dicarboxylic acid anhydrides may be accelerated by known acid catalysts. The esterification reactions are advantageously carried out under azeotropic conditions.

Urethane(meth)acrylates containing one hydroxyl group per molecule obtained from one the above mentioned hydroxy alkyl(meth)acrylates or oligo(meth)acrylates containing one hydroxyl group, a polyisocyanate and a di-functional polyol may also be used as component A for the preparation of the dispersing agents according to the invention. The polyisocyanate used may be, for example, 2,4-tolylene diisocyanate, 2,6-tolylene diisocyanate, diphenyl methane-4,4'-diisocyanate, hexamethylene diisocyanate, isophorone diisocyanate or triisocyanate obtained by the reaction of trimethylol propane with diisocyanates in the proportions of 1:3 or by the reaction of diisocyanates with water. The following are examples of di-functional polyols: ethylene glycol, propane-1,2-diol, propane-1,3-diol, butane-1,4-diol, neopentyl glycol, hexane-1,4-diol, hexane-1,6-diol, 1,4-dihydroxy cyclohexane, 1,4-bishydroxy methylcyclohexane, diethylene glycol, triethylene glycol, tetraethylene glycol, octaethylene glycol, polyethers containing 2 hydroxyl groups per molecule and obtained from ethylene oxide or propylene oxide, polyesters containing 2 hydroxyl groups per molecule obtained from at least one difunctional alcohol and at least one dicarboxylic acid such as succinic acid, glutaric acid, adipic acid, fumaric acid, maleic acid, phthalic acid, isophthalic acid, tetrahydrophthalic acid or hexahydrophthalic acid.

The urethane(meth)acrylates containing one hydroxyl group per molecule may advantageously be prepared by first carrying out a preliminary reaction to synthesise an adduct of a hydroxy alkyl(meth)acrylate or oligo(meth) acrylate containing one hydroxyl group per molecule and a polyfunctional isocyanate, using a molar ratio which leaves one free isocyanate group per molecule of adduct. The adduct may then be reacted with one of the polyols exemplified above. The reactions may be carried out in solvents which are inert towards polyisocyanates, such as acetone, butanone, cyclohexanone, benzene, toluene, cyclohexane, methylene chloride, ethylene glycol dimethyl ether, tetrahydrofuran, dioxane, ethyl acetate, butylacetate, dimethyl formamide or mixtures of these solvents.

These reactions are generally carried out at temperatures of 20°–90° C. although higher temperatures may in some cases be employed.

The isocyanate reactions may be catalysed in known manner, for example with tin octoate, dibutyl tin dilaurate or tertiary amines.

The compounds used as component B for the preparation of the dispersing agents according to the invention are saturated or ethylenically unsaturated tertiary alkylamines containing one hydroxyl group per molecule, such as dimethylamino ethanol, 2-(2-dimethylamino-ethoxy) ethanol, 2-diethylamino ethanol, 2-(2-diethylamino-ethoxy)-ethanol, 2-dipropylamino ethanol, 2-dibutylamino ethanol, 3-dimethylamino-2-propanol, 2-(cyclohexyl methyl amino)-ethanol, 2-(cyclohexyl ethyl amino) ethanol, 2-(methylphenylamino) ethanol, 2-(ethylphenylamino)ethanol, 1-(ethylphenyl amino)-2-propanol and Michael addition products of 1 (meth)acrylic acid ester containing 1–3 (meth)acryloyl groups per molecule, preferably acryloyl groups, and a secondary alkylamine containing 1 hydroxyl group per molecule.

The following are examples of suitable (meth) acrylic acid esters: methyl(meth)acrylate, ethyl(meth) acrylate, propyl(meth)acrylate, butyl(meth)acrylate, isobutyl(meth)acrylate, hexyl(meth)acrylate, 2-ethylhexyl (meth)acrylate, 1,4-butanediol di(meth)acrylate, neopentyl glycol di(meth)acrylate, 1,6-hexanediol di(meth)acrylate, trimethylol propane tri(methyl)acrylate and ethoxylated or propoxylated trimethylol propane tri(meth)acrylate.

2-methylamino ethanol, 2-ethylamino ethanol, 2-methylamino propanol, 2-ethylamino propanol, 2-cyclohexylamino ethanol, 1-cyclohexylamino-2-propanol and 2-phenylamino ethano) are examples of secondary alkylamines.

Saturated and ethylenically unsaturated tertiary alkylamines containing one hydroxyl group per molecule (component B) are also obtained by a Michael additions reaction of one of the above described hydroxy alkyl (meth)acrylates or oligo(meth)acrylates containing one hydroxyl group per molecule, preferably acrylates, with a secondary alkylamine such as, for example, dimethylamine, diisobutylamine, bis-(2-ethylhexyl)-amine, dodecyl methylamine, methyl tetrahexylamine, hexadecyl methylamine, methyl octodecylamine, diallylamine, etc.

The reaction of components A, B and C to form the dispersing agents according to the invention is carried out by introducing components A and B into the reaction vessel and adding $P_2O_5$ (component C) portionwise with cooling. $P_2O_5$ (component C) may if desired be added dropwise in the form of a polyphosphoric acid for easier dosing. To ensure a sufficient degree of reaction, the total quantity of components A and B is used in excess, based on component C. The reaction is carried out at an elevated temperature, preferably at 40° to 100° C. It is optionally carried out in the presence of an inert solvent such as benzene, toluene, cyclohexane, ethyl acetate, butyl acetate, methylene chloride, dioxane, tetrahydrofuran, acetone, butanone, diethyl ketone or cyclohexanone.

Neutral dispersing agents are required for certain purposes. Dispersing agents obtained by the reaction of components A, B and C and still having a residual acid number may be neutralised to an extent corresponding to this acid number with a base such as an alkali metal hydroxide, alkali metal carbonate, alkali metal bicarbonate or ammonia or any of the known primary or secondary amines or in particular tertiary amines. Aliphatic and cycloaliphatic amines are preferred and these may also contain hydroxyl substituents or halogen substituents. Neutralisation may also be carried out with unsaturated amines such as N,N-dimethyl-amino ethyl methacrylate, aminopropyl methacrylamide, Michael adducts of secondary amines and di- or tri-(meth)acrylates, or compounds of the kind listed for component B.

If the inhibitors and antioxidents which are used in the preparation of component A and optionally component C or the reaction of component A, B and C, for which they are added in quantities of 0.001 to 0.1% by weight each, based on the total mixture, do not provide sufficient storage stability in the dark, an after stabilization may be carried out with these inhibitors and antioxidents.

Suitable auxiliary agents of this kind include, for example, phenols and phenol derivatives, preferably sterically hindered phenols containing alkyl substituents with 1 to 6 carbon atoms in both ortho positions to the phenolic hydroxyl group, amines, preferably secondary acrylamines and their derivatives, quinones, copper-I salts of organic acids or products of addition of copper (I) halides to phosphites.

The following are specific examples: 4,4'-bis-(2,6-di-tertiary butyl)-phenol; 1,3,5-trimethyl-2,4,6-tris-(3,5-di-tertiary butyl-4-hydroxy benzyl)-benzene; 4,4'-butylidene-bis-(6-tertiary butyl)-m-cresol; 3,5-di-tertiary butyl-4-hydroxybenzyl-phosphonic acid-diethyl ester; N,N'-bis-($\beta$-naphthyl)-p-phenylene diamine; N,N'-bis-(1-methylheptyl)-p-phenylenediamine; phenyl-$\beta$-naphthylamine; 4,4'-bis-($\alpha,\alpha$-dimethyl benzyl)-diphenylamine; 1,3,5-tris-(3,5-di-tertiary butyl-4-hydroxyhydro cinnamoyl)-hexahydro-s-triazine; hydroquinone; p-benzoquinone; 2,5-di-tertiary butyl-quinone; tolyhydroquinone; p-tertiary butyl-pyrocatechol; 3-methyl-pyrocatechol; 4-ethyl-pyrocatechol; chloranil; naphthoquinone; copper naphthenate; copper octoate; Cu(I)Cl/triphenyl phosphite; Cu(I)Cl/trimethyl phosphite; Cu(I)Cl/trichloroethyl phosphite; Cu(I)Cl/tripropyl phosphite; p-nitrosodimethyl aniline.

Other suitable stabilizers are described in "Methoden der organischen Chemie" (Houben-Weyl), 4th edition, volume XIV/1, pages 433–452, 756, Georg Thieme Verlag, Stuttgart 1961.

The dispersing agents according to the invention are eminently suitable for dispersing magnetic pigments such as $\gamma$-$Fe_2O_3$, mixed crystals of $\gamma$-$Fe_2O_3$, cobalt-doped $\gamma$-$Fe_2O_3$ or $Fe_3O_4$, $CrO_2$, barium ferrite, ferromagnetic alloys such as Fe-Co, Co-Ni, Fe-Co-Ni, Fe-Co-B, Fe-Co-Cr-B, Mn-B, Mn-Al and Fe-Co-V, iron nitride and mixtures of these substances.

The dispersing agents according to the invention may also be used for other pigments and powders, for example for dispersing antistatic agents such as carbon black, graphite, carbon black graft polymers, pulverulent lubricants such as molybdenum oxide, tungsten disulphide, mica or organic powders such as polyethylene, polypropylene, ethylene-vinyl chloride copolymers, Teflon and pulverulent abrasives and fillers such as aluminium oxide, chromium oxide, natural and synthetic corundum, natural and synthetic diamonds, garnet, silicon carbide, silicon oxide, titanium dioxide, $\delta$-$Fe_2O_3$, boron nitride, calcium carbonate, calcium sulphate, kaolin, talcum, molybdenum sulphide, zirconium and others which may be used, for example, for producing backing layers, in particular for video tapes.

Such pigments and powders may be dispersed in a solvent, solvent mixture or dissolved binder with the aid of the dispersing agents according to the invention. Suitable binders include known copolymers such as vinyl chloride/vinyl ester copolymers, methacrylic acid ester/vinyl chloride copolymers and acrylonitrile/butadiene copolymers or polyurethanes, polyesters, polyamides, polyepoxides, cellulose esters, etc.

The dispersing agents according to the invention are particularly suitable for use in combination with binders which are hardened by radiation such as those which have been described for use in magnetic coatings, for example in German Offenlegungschriften Nos. 3,029,818, 3,029,819, 3,109,765, 3,133,439, 3,133,440, 3,137,691, 3,200,970, and 3,207,293 and European Patent Applications Nos. 0,047,321 and 0,083,666 and those used in radiation hardenable back coatings for magnetic tapes as described in German Offenlegungsschriften Nos. 3,213,055 and 3,221,198.

The coating dispersions are prepared in known manner by mixing the magnetic material with a suitable solvent by means of kneaders, stirrers, dissolvers or other mixing apparatus. It is customary to prepare a premixed dispersion consisting predominantly of magnetic pigment, pulverulent antistatic agents, pulverulent lubricants and abrasives, solvents and the dispersing agents according to the invention and optionally also binders and subjecting this dispersion to a grinding process until the pigments and powders are sufficiently finely divided. Grinding may be carried out, for example, in ball mills, bead mills, sand mills or the like. The preliminary dispersion is then mixed with solvents, dissolved binders and liquid additives or additives which are soluble in the solvents used, such as lubricants, plasticizers and viscosity regulating substances and ground up to form a coating dispersion having a suitable viscosity.

The magnetic dispersion is applied to a non-magnetizable support by means of a suitable apparatus (reverse roll coater, raster printer, extrusion casting apparatus) in a magnetic field. This non-magnetizable support may consist, for example, of a polyester such as polyethylene terephthalate, a polyolefin such as polypropylene, a cellulose ester such as cellulose diacetate or cellulose triacetate, a polycarbonate, polyamide or polyimide, paper, a metal foil or a rigid support of aluminium, copper or similar material.

After evaporation of the solvent, the as yet unhardened magnetic recording carrier may be calendered between rollers heated to 60° C. at 80° kp/cm line pressure. It is then hardened by ionizing radiation (electron, neutron, gamma or X rays). Hardening is preferably carried out with electron radiation using a dose of 0.5 to 25 Mrad, in particular 0.5–10 Mrad. In order to ensure adequate hardening at depth, the accelerator voltage should not be below 100 kV.

A higher accelerator voltage is particularly advantageous for magnetic recording carriers in the form of tapes in that it enables several layers of tape to be hardened simultaneously and very economically under a single source of radiation so that high production rates can be achieved.

The process of preparing the dispersing agents according to the invention is illustrated in the following examples.

Unsaturated partial ester A containing hydroxyl groups

An ethylenically unsaturated partial ester containing OH groups is prepared by esterifying 1 mol of an ethoxylated trimethylol propane (OH number 550 (mg KOH/g of substance) degree of ethoxylation about 4) azeotropically with 2 mol of acrylic acid.

925 g of ethoxylated trimethylol propane are heated under reflux with 430 g of acrylic acid, 12 g of p-toluene sulphonic acid, 1 g of p-methoxyphenol, 1.2 g of di-tertiary butyl-hydroquinone and 280 g of toluene in a stream of air and the water of reaction produced is removed azeotropically. When the acid number is below 3 (mg KOH/g of substance), the solvent is removed under vacuum and the product is clarified by filtration. An ethylenically unsaturated partial ester containing OH groups and having an OH number (mg KOH/g of substance) of 105 and an acid number (mg KOH/g of substance) of 2 is obtained.

Unsaturated. ester B containing hydroxyl groups

An unsaturated ester containing OH groups is prepared by esterifying one equivalent of the unsaturated partial ester A azeotropically with 1 mol of ricinoleic acid. 387.4 g of ricinoleic acid are azeotropically esterified with 696 g of the unsaturated partial ester A in the presence of 9.5 g of p-toluene sulphonic acid, 1.1 g of di-tertiary butyl-hydroquinone and 1.1 g of p-methoxy phenol in 480 g of toluene while a stream of air is passed through. When no more water separates, the carrier agent is distilled off under vacuum. A hydroxyl-containing unsaturated ester having an OH number of 38 and an acid number of 2.3 is obtained.

EXAMPLE 1

17 g of phosphorus pentoxide are added portionwise to 377 g of the hydroxyl-containing unsaturated ester B at room temperature with stirring while air is passed through the reaction mixture. The temperature is then raised to 60° C. and the reaction mixture is stirred until all the phosphorus pentoxide has dissolved. 0.2 g of di-tertiary butyl-hydroquinone are then added and 10.7 g of N,N-dimethylaminoethanol are slowly added dropwise. Heating and stirring are continued after the exothermic reaction has died down until a constant acid number is obtained. After hydrolysis of the meta and pyrophosphoric acid structures, an end acid number of 42 is found by titration with a 0.1 N aqueous NaOH solution using thymolphthalein as indicator.

Michael Adduct I 129 g of diisopbutylamine are added dropwise to 116 g of hydroxyethyl acrylate and 0.12 g of p-methoxyphenol at 10° C. while air is passed through. Stirring is continued for a further 2 hours at room temperature after all the diisobutylamine has been added.

EXAMPLE 2

28.4 g of phosphorus pentoxide are added portionwise to 224.2 g of the unsaturated partial ester A while air is passed through. When all the phosphorus pentoxide has been added, the temperature is raised to 60° C. and stirring is continued until all the phosphorus pentoxide has gone into solution. 0.15 g of di-tertiary butyl-hydroquinone are then added and 49 g of the Michael adduct I is slowly added dropwise. The reaction mixture is stirred at 60° C. until the acid number remains constant. Titration of the end acid number as described in Example 1 gives a value of 89.

Hydroxyl-containing unsaturated ester C 399 g of octaethylene glycol, 8.95 g of p-toluene sulphonic acid, 1.59 g of di-tertiary butyl-hydroquinone, 1.59 g of p-methoxyphenol and 450 g of toluene are added for azeotropic esterification to an adduct obtained by heating 561 g of the unsaturated partial ester A and 98 g of maleic acid anhydride to 100° C. The reaction mixture is heated to boiling while air is passed through and the water of reaction is continuously removed. The unsaturated ester obtained has an OH number of 45 and acid number 8.

Michael Adduct II 150 g of 2-methylamino ethanol are added dropwise with stirring to 452 g of hexanediol-bis-acrylate at such a rate that the temperature does not exceed 60° C. while a stream of nitrogen is passed through. Stirring is continued for 2 hours after all the methylaminoethanol has been added. The reaction product has an OH number of 81.

EXAMPLE 3

13.5 g of phosphorus pentoxide are slowly introduced portionwise with stirring at room temperature into 250 g of the hydroxyl-containing unsaturated polyester C and 0.15 g of di-tertiary butyl-hydroquinone while air is passed through. When all the phosphorus pentoxide has been added, the temperature is raised to 100° C. and stirring is continued until all the phosyhorus pentoxide has gone into solution. The temperature is then lowered to 60° C. and 30 g of the Michael adduct II are slowly added dropwise. Stirring is continued at the same temperature until the acid number remains constant. The final acid number obtained by titration as described in Example I is found to be 53.

Michael adduct III 87 g of hydroxyethyl acrylate are added dropwise at 70° C. to 212.3 g of N-methyl octadecylamine and 0.15 g of p-methoxyphenol while air is passed through. Stirring is continued for 4 hours at this temperature after the slightly exothermic reaction has died down. A substance which is waxy at room temperature is obtained.

EXAMPLE 4

.28.4 g of phosphorus pentoxide are added portionwise with stirring to 224.2 g of the hydroxyl-containing unsaturated ester A and 0.14 g of di-tertiary butyl-hydroquinone while air is passed through. When all the phosphorus pentoxide has been added, the temperature is raised to 60° C. and stirring is continued until all the phosphorus pentoxide has dissolved. 32 g of the Michael adduct III and 190 g of butanone are then added to the reaction mixture and stirring is continued at 60° C. until the acid number remains constant. The final acid number is found to be 94 (based on the solids content).

EXAMPLE 5

34.8 g of hydroxyethyl acrylate are added drop-wise with stirring to 52.2 g of toluene diisocyanate and 0.08 g of hydroquinone at 60° C. while air is passed through. 60.9 g of tetraethylene glycol are slowly added drop-wise when the isocyanate content has fallen to 14.5% and stirring is then continued until the isocyanate content is below 0.1%. 39.9g of 2,2-dimethylamino-ethoxy ethanol and 0.03 g of di-tertiary butyl-hydroquinone are then stirred into the reaction mixture and 28.2 g of phosphorus pentoxide are finally added portionwise. The reaction mixture is stirred until the acid number is constant. Determination of the final acid number gives a value of 78.

EXAMPLE 6

72.1 g of Michael adduct II are added dropwise with stirring at 60° C. to 150.0 g of the dispersing agent from Example 2, and stirring is then continued for a further 3 hours at this temperature. Neutralisation is checked by means of a potentiometric measuring arrangement (glass electrode, pH meter).

The preparation of radiation hardenable magnetic recording carriers by means of the dispersing agents according to the invention is described below with the aid of examples.

EXAMPLE A

The following components are mixed together for preparing a magnetic coating dispersion:
100 parts by weight of $\gamma$-$Fe_2O_3$,
3.5 parts by weight of a dispersing agent consisting of the reaction product from Example 1,
78.7 parts by weight of a 30% solution of a binder consisting of the reaction product according to DE No. 3,200,970, Example 5,
0.2 parts by weight of stearic acid and
68 parts by weight of methyl ethyl ketone.

A preliminary dispersion of the mixture is prepared in a disperser and then ground in a ball mill with mechanical stirrer for 3 hours. After filtration, the coating lacquer is cast on a 20 μm polyester film (thickness of dry layer 5μ) and orientated in the magnetic field. After drying, the coated material is calendered under a line pressure of 80 kp/cm, irradiated with an electron dose of 10 Mrad in an electron radiation apparatus with an acceleration voltage of 175 kV and then split up into widths of 6.3 mm.

EXAMPLE B

A magnetic dispersion is prepared by mixing the following components:
100 parts by weight of $\gamma$-$Fe_2O_3$,
3.5 parts by weight of a dispersing agent consisting of the reaction product from Example 2,
78.7 parts by weight of a 30% solution of a binder consisting of the reaction product according to DE No. 3,200,970, example 5,
0.2 parts by weight of stearic acid and
68 parts by weight of methyl ethyl ketone.
The dispersion is worked up as in Example A.

EXAMPLE C

The following components are mixed together for preparing a magnetic dispersion:
100 parts by weight of $\gamma$-$Fe_2O_3$,
3.5 parts by weight of a dispersing agent consisting of the reaction product from Example 6,
78.7 parts by weight of the reaction product of a binder according to DE No. 3,200,970, example 5,
0.2 parts by weight of stearic acid and
68 parts by weight of methyl ethyl ketone.
The product is worked up as in Example A.

COMPARISON EXAMPLE

A magnetic dispersion is prepared by mixing the following components:
100 parts by weight of $\gamma$-$Fe_2O_3$,
3.5 parts by weight of lecithin,
78.7 parts by weight of a 30% solution of a binder consisting of the reaction product according to DE No. 3,200,970, example 5,
0.2 parts by weight of stearic acid and
68 parts by weight of methyl ethyl ketone.
The product is worked up by a method analogous to that of example A.

The magnetic recording carriers prepared according to the invention are distinguished by their excellent dispersion properties, which manifest themselves primarily in the improved facility for orientation of the magnetic particles (Table 1). The ability of the particles to orientate themselves is determined by the following measurements:

$M_R/M_S$ ratio of remanent magnetisation to magnetisation at 79.6 kA/m;

OR ratio of remanent magnetisation in the longitudinal and transverse direction of the tape after previous magnetisation with a field strength of 318.4 kA/m.

TABLE 1

| Sample according to | $M_R/M_S$ | OR |
|---|---|---|
| Example A | 0.88 | 2.7 |
| Example B | 0.89 | 2.9 |
| Example C | 0.89 | 2.8 |
| Comparison Example | 0.87 | 2.5 |

Due to the improved orientation, the magnetic recording carriers according to the invention have improved electro acoustic data (sensitivity, modulation).

In addition, the magnetic recording carriers according to the invention show considerable advantages in the mechnical properties of the tapes. Since the dispersing agents according to the invention are cross linked by radiation and are incorporated in the matrix of the binder by irradiation when radiation hardenable binders are used, the tendency of the tapes according to the invention to stick is considerably reduced, in particular after air conditioned storage, and the solvent resistance of the layers according to the invention is improved (Table 2).

The following test methods were employed:
Test for tendency to stick WK: 150 m of the tape to be tested are rolled up under constant winding conditions (winding pull 150 p) and stored at 55° C. for 72 hours.

After the tape has been slowly cooled to 20° C., it is rolled off except for the last 50 m. The force of traction required to pull off 3 m of test tape is then determined (given in mp).

Test for solvent resistance:
THF test:
A linen rag impregnated with tetra hydrofuran is passed over 15 cm of tape in 10 reversing steps under a specified contact pressure and at a specified velocity. At the end of the test, the test tape is assessed according to the following scale:
insoluble
slightly soluble
soluble.

TABLE 2

| Test according to | WK | THF Test |
| --- | --- | --- |
| Example A | 117 mp | insoluble |
| Example B | 78 mp | insoluble |
| Example C | 125 mp | insoluble |
| Comparison Example | 2080 mp | slightly soluble. |

The magnetic recording carriers according to the invention not only have a reduced tendency to stick and improved solvent resistance but also reduced friction, reduced sensitivity to scratching and improved abrasion resistance under extreme stress.

We claim:

1. Radiation hardenable magnetic recording carrier consisting of a non-magnetic layer support and a magnetic layer containing pigments, binders, other additives and radiation hardenable dispersing agents based on ethylenically unsaturated phosphoric acid ester mixtures on the front of the layer support and optionally a non-magnetizable layer containing binder on the back of the layer support, which layer contains further additives and radiation hardenable dispersing agents based on ethylenically unsaturated phosphoric acid ester mixtures, characterised in that the phosphoric acid ester mixtures used as dispersing agents are capable of forming betaine type structures and are reaction products of
   A. 1–2.5 OH equivalents of a (meth)acrylic acid ester and/or oligo(meth)acrylate containing one hydroxyl group per molecule,
   B. 1–2.5 OH equivalents of a saturated and/or ethylenically unsaturated tertiary alkylamine containing 1 hydroxyl group per molecule and
   C. 1 mol of phosphorus pentoxide or 1 mol of phosphorus pentoxide equivalent,
in which the sum of OH equivalents from A and B amount to at least 3–4 and the reaction products have an acid number (mg KOH/g of substance) of less than 200, preferably less than 150, in particular less than 100 and are optionally neutralised with a base.

2. Radiation hardenable magnetic recording carrier according to claim 1, characterised in that component A of the dispersing agent consists of at least one $C_1$–$C_6$ alkyl-hydroxyalkyl(meth)acrylate, a glycerol-, trimethylol propane-di(meth)acrylate, pentaerythritol tri(meth)acrylate or an ethoxylated or propoxylated (meth)acrylate obtained from the corresponding alcohols.

3. Radiation hardenable magnetic recording carrier according to claim 1, characterised in that component A of the dispersing agent is a reaction product of at least one ester of a $C_3$–$C_{18}$ monohydroxy carboxylic acid and a hydroxy alkyl(meth)acrylate and/or oligo (meth)acrylate containing 1 hydroxyl group per molecule.

4. Radiation hardenable magnetic recording carrier according to claim 1, characterised in that component A of the dispersing agent consists of at least one polyester- or polyether-(meth)acrylate containing one hydroxyl group per molecule and obtained by the reaction of a di- or tri-hydroxy functional polyester or polyether with (meth)acrylic acid or with an aliphatic, cycloaliphatic or aromatic dicarboxylic acid or corresponding derivative and a hydroxy alkyl (meth)acrylate or oligo(meth)acrylate containing one hydroxyl group per molecule.

5. Radiation hardenable magnetic recording carrier according to claim 1, characterised in that component A of the dispersing agent consists of at least one urethane(meth)acrylate which contains one hydroxyl group per molecule and has been obtained by the reaction of a hydroxy alkyl(meth)acrylate or oligo (meth)acrylate containing one hydroxyl group per molecule, a di- or tri-functional isocyanate and a difunctional alcohol, polyester diol or polyether diol.

6. Radiation hardenable magnetic recording carrier according to claim 1, characterised in that component B of the dispersing agent consists of at least one alkyl- and/or cycloalkyl- and/or aryl-N,N-disubstituted aminoethanol or amino propanol.

7. Radiation hardenable magnetic recording carrier according to claim 1, characterised in that component B of the dispersing agent consists of at least one saturated or unsaturated tertiary amine which contains one hydroxyl group per molecule and has been obtained by Michael addition from a (meth)acrylic acid ester containing 1–3 (meth)acryloyl groups per molecule and an alkyl-, cyclo-alkyl- or aryl-N-substituted aminoethanol or aminopropanol.

8. Radiation hardenable magnetic recording carrier according to claim 1, characterised in that component B of the dispersing agent consists of at least one saturated or unsaturated tertiary amine containing one hydroxyl group per molecule and obtained by Michael addition from a hydroxy alkyl(meth) acrylate or oligo(meth)acrylate and a dialkylamine.

9. Radiation hardenable magnetic recording carrier according to claim 1, characterised in that the phosphoric acid ester mixtures are neutralised with an alkali metal hydroxide, alkali metal carbonate, alkali metal bicarbonate, ammonia or a saturated or ethylenically unsaturated amine, in particular a tertiary amine, in accordance with the acid number determined by a neutralisation titration.

10. Radiation hardenable magnetic recording carrier according to claim 1, characterised in that the binder used is an olefinically unsaturated, radiation hardenable compound.

* * * * *